T. V. BUCKWALTER.
UNIVERSAL JOINT.
APPLICATION FILED DEC. 10, 1907.

898,829.

Patented Sept. 15, 1908

WITNESSES:

INVENTOR
Tracy V. Buckwalter
BY
Charles N. Butler
ATTORNEY.

UNITED STATES PATENT OFFICE.

TRACY V. BUCKWALTER, OF ALTOONA, PENNSYLVANIA.

UNIVERSAL JOINT.

No. 898,829.  Specification of Letters Patent.  Patented Sept. 15, 1908.

Application filed December 10, 1907. Serial No. 405,896.

*To all whom it may concern:*

Be it known that I, TRACY V. BUCKWALTER, a citizen of the United States, residing at Altoona, in the county of Blair and State of Pennsylvania, have invented certain Improvements in Universal Joints, of which the following is a specification.

This invention is a universal joint designed particularly for transmitting rotary motion with the minimum friction and wear, and to this end it comprises a novel arrangement of ball bearings providing motion in transverse planes.

Figure 1:
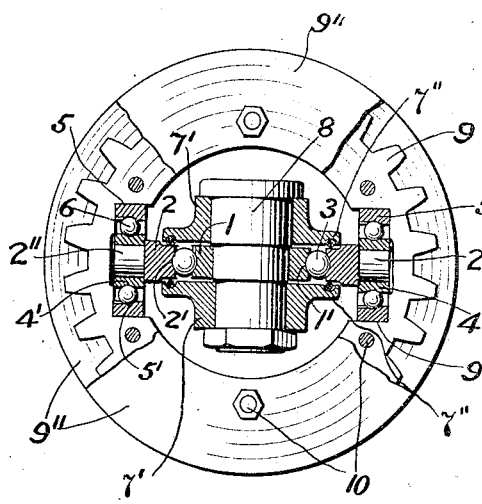
Figure 2:
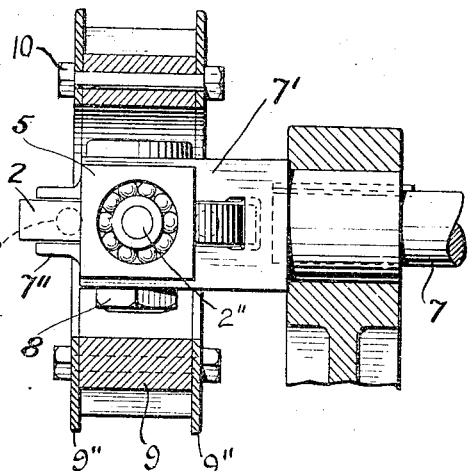
Figure 3:
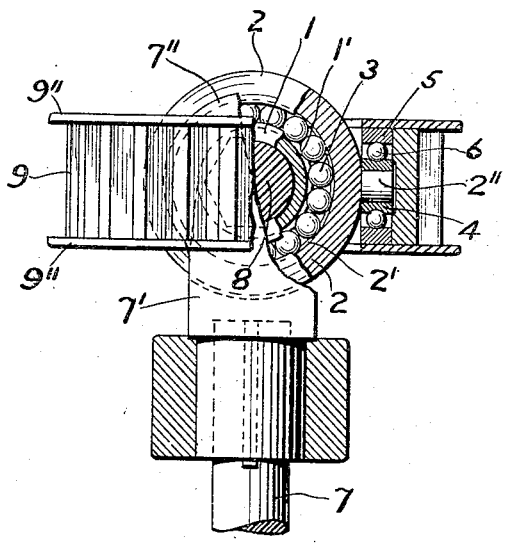

In the accompanying drawings, Figure 1 is an irregular sectional view representing an application of my invention; Fig. 2 is a sectional view of the same mechanism transverse to the view shown in Fig. 1; Fig. 3 is an irregular sectional view of the same mechanism transverse to the views shown in Figs. 1 and 2; and Fig. 4 is an irregular sectional view representing a further application of the invention.

As represented in the drawings, the invention comprises a bearing member 1 having an exterior circular race 1', a bearing member 2 having the interior circular race 2' concentric with the race 1' and the diametrically disposed bosses 2'', balls 3 disposed between the bearing members in the races, bearing members 4 fixed on the bosses 2'' and having the exterior circular races 4' disposed at right angles to the races 1' and 2', bearing members 5 having the interior circular races 5' concentric with the races 4', and balls 6 disposed between the bearing members 4 and 5. The bearing member 1 is fixed to a shaft 7 having the bifurcations 7' forming a yoke in which the bearing member is held by the bolt 8, the bifurcations having the flanges 7'' overlapping the bearing member 2.

As shown in Figs. 1, 2, and 3, a toothed ring or wheel 9 has the rectangular interior recesses 9' in which the bearing members 5, of rectangular exterior contour, are fixed, and fixed to the faces of the ring by the bolts 10 are the circular plates 9'' which overlap the bearing members 5.

Figure 4:
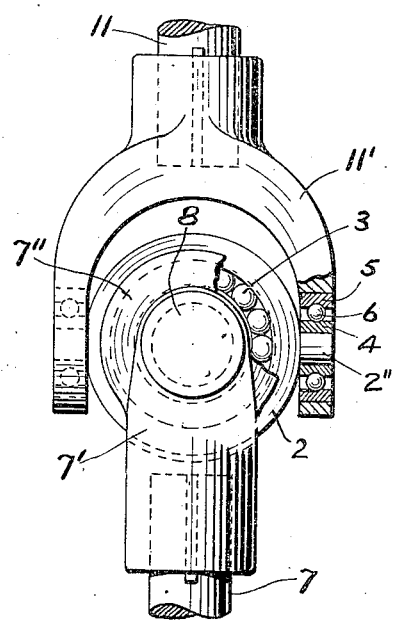

As shown in Fig. 4, the bearing members 5 are fixed to a shaft 11 having a yoke formed by the bifurcations 11' in which the bearing members are fixed. It will be observed that in transmitting power in either direction through the parts thus connected, the angle of the axes of revolution of the driving and driven parts may be varied freely, the power being carried transversely with relation to the races 1' and 2', and radially with relation to the races 4' and 5'. The bearing members with the balls, connected in the manner described, comprise a complete universal joint as will appear from the fact that these parts can be held by hand and operated.

It is to be understood that the expression annular bearing member, as used in the claims, signifies a bearing member having an annular surface.

Having described my invention, I claim:

1. A universal joint comprising a pair of bearing members having concentric races, balls in said races, a second pair of bearing members having concentric races, and balls in said races last named, the exterior bearing member of said first pair being fixed to the interior bearing member of said second pair so that the two sets of balls act in transverse planes.

2. A universal joint comprising a pair of concentric annular bearing members, balls between said bearing members, the exterior of said bearing members having diametrically disposed bosses thereon, an annular bearing member fixed on each of said bosses, an annular bearing member concentric with each of said last named bearing members, and balls disposed between said last named concentric bearing members.

3. A universal joint comprising an annular bearing member, a concentric annular bearing member exterior thereto, balls between said bearing members, one of said bearing members having a flange fixed thereto and overlapping the other of said bearing members, a pair of diametrically disposed annular bearing members fixed to said exterior bearing member, an exterior annular bearing member concentric with each of said diametrically disposed bearing members, and balls between the last named concentric bearing members.

4. A yoke, an annular bearing member between the bifurcations of said yoke, means for fixing said parts together, an annular bearing member exterior to the first named bearing member, balls between said bearing members, parallel annular bearing members fixed diametrically to said exterior bearing member in planes transverse thereto, an annular bearing member exterior to each of said parallel bearing members, balls between the corresponding members of the last named bearing members, and a power transmitting member fixed to said last named exterior bearing members.

5. The combination of a journaled shaft, a bearing member with a race way carried by said shaft, a second bearing member with a race-way surrounding said first race-way, balls disposed between said race-ways, bearing members carried by said second bearing member with race-ways disposed transversely to the plane of said first named race-ways, bearing members having race-ways surrounding said third mentioned race-ways, balls disposed between said third and fourth mentioned race-ways, and power transmission mechanism fixed to said last named bearing members.

In witness whereof I have hereunto set my name this 7th day of Dec., 1907, in the presence of the subscribing witnesses.

TRACY V. BUCKWALTER.

Witnesses:
J. L. MINICK,
P. H. MARKLEY.